United States Patent
Tamura

(10) Patent No.: US 8,988,546 B2
(45) Date of Patent: Mar. 24, 2015

(54) IMAGE PROCESSING DEVICE, IMAGE PROCESSING METHOD, IMAGE CAPTURING DEVICE, AND PROGRAM

(75) Inventor: Nobuhiko Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 13/525,155

(22) Filed: Jun. 15, 2012

(65) Prior Publication Data

US 2012/0327259 A1 Dec. 27, 2012

(30) Foreign Application Priority Data

Jun. 24, 2011 (JP) ................................. 2011-140741
May 9, 2012 (JP) ................................. 2012-107581

(51) Int. Cl.
*H04N 5/228* (2006.01)
*G06T 5/00* (2006.01)
*G06T 5/50* (2006.01)
*G06T 15/20* (2011.01)
*H04N 5/232* (2006.01)

(52) U.S. Cl.
CPC . *G06T 5/009* (2013.01); *G06T 5/50* (2013.01); *G06T 15/205* (2013.01); *H04N 5/23216* (2013.01); *G06T 2200/21* (2013.01); *G06T 2207/10052* (2013.01)
USPC ...................... 348/222.1; 348/218.1; 348/239

(58) Field of Classification Search
CPC .... H04N 5/23232; H04N 5/262; H04N 5/247
USPC .................... 348/222.1, 239, 218.1
See application file for complete search history.

(56) References Cited

U.S. PATENT DOCUMENTS

| | | | | |
|---|---|---|---|---|
| 8,106,994 B2 * | 1/2012 | Ichimura | ...................... | 348/340 |
| 8,325,241 B2 * | 12/2012 | Yoshioka | ................ | 348/207.99 |
| 2003/0026474 A1 * | 2/2003 | Yano | .............................. | 382/154 |
| 2007/0230944 A1 * | 10/2007 | Georgiev | ...................... | 396/322 |
| 2009/0190022 A1 | 7/2009 | Ichimura | ...................... | 348/340 |
| 2010/0103175 A1 | 4/2010 | Okutomi et al. | .............. | 345/428 |
| 2012/0148173 A1 * | 6/2012 | Shin et al. | ..................... | 382/300 |
| 2014/0270518 A1 * | 9/2014 | Yano | ............................ | 382/167 |

FOREIGN PATENT DOCUMENTS

| | | |
|---|---|---|
| JP | 2008/294741 | 12/2008 |
| WO | 2008/050904 | 5/2008 |

* cited by examiner

*Primary Examiner* — Sinh Tran
*Assistant Examiner* — Zhenzhen Wu
(74) *Attorney, Agent, or Firm* — Fitzpatrick, Cella, Harper & Scinto

(57) ABSTRACT

An image processing device for generating a composite image using multi-viewpoint image data before color interpolation captured by a camera array image capturing device, includes a unit configured to acquire information of a pixel value and a pixel position in the multi-viewpoint image data, a pixel position determination unit configured to determine the pixel position in the composite image in the pixel position of each pixel of the multi-viewpoint image data in accordance with an arbitrary focus position based on optical parameters at the time of the image capturing, a color derivation unit configured to derive the color of each pixel of the multi-viewpoint image data, and a pixel value calculation unit configured to calculate the pixel value of each pixel of the composite image using the determined pixel position in the composite image and the pixel value of the multi-viewpoint image data corresponding to the derived pixel color.

7 Claims, 22 Drawing Sheets

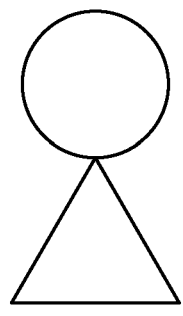
SUBJECT
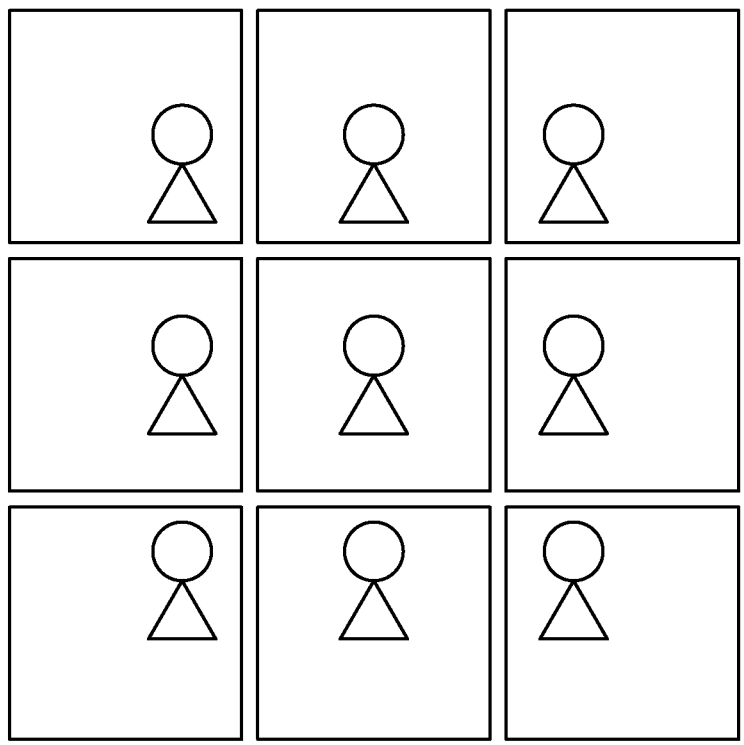
MULTI-VIEWPOINT IMAGE
FIG.6

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG.10

| PIXEL POSITION OF COMPOSITE IMAGE | COLOR | PIXEL VALUE OF MULTI-VIEWPOINT IMAGE |
|---|---|---|
| ⋮ | ⋮ | ⋮ |
| (10,9) | B | 21 |
| (10,10) | R | 24 |
| (10,10) | R | 26 |
| (10,10) | G | 32 |
| (10,10) | G | 34 |
| (10,10) | B | 22 |
| (10,11) | R | 25 |
| ⋮ | ⋮ | ⋮ |

1101 groups the two (10,10) R rows; 1102 groups the two (10,10) G rows; 1103 indicates the (10,10) B row.

FIG.11

| 15 | 15 | 15 | 15 | 10 |
|----|----|----|----|----|
| 15 | 15 | 15 | 15 | 5  |
| 20 | 10 | 10 | 15 | 5  |
| 20 |    | 10 | 15 | 10 |
| 20 | 10 | 10 | 15 | 10 |

FIG.16

| CORRESPONDING PIXEL POSITION | TYPE OF COLOR | PIXEL VALUE |
|---|---|---|
| (100,100) | B | 21 |
| (100,200) | R | 24 |
| (100,300) | R | 26 |
| (200,100) | G | 32 |
| (200,200) | G | 34 |
| (200,300) | B | 22 |
| (300,100) | R | 25 |

FIG.22

IMAGE PROCESSING DEVICE, IMAGE PROCESSING METHOD, IMAGE CAPTURING DEVICE, AND PROGRAM

BACKGROUND OF THE INVENTION

1. Field of the Invention

The present invention relates to composition processing of a multi-viewpoint image.

2. Description of the Related Art

Conventionally, when an image was captured by erroneous focus adjustment of a camera, it was necessary to recapture the image after performing focus adjustment again. Further, when it was desired to obtain focused images of a plurality of subjects the depths of which are different from each other, it was necessary to capture the image of each subject in focus a plurality of times.

In recent years, a technique called light field photography has been developed, that is capable of acquiring images from multiple viewpoints by adding a new optical element to the optical system and of adjusting the focus position by the later image processing (refocus).

By using this technique, there is an advantage that a failure in focus adjustment at the time of image capturing can be recovered by image processing because focus adjustment can be performed after image capturing. Further, there is also an advantage that it is possible to acquire a plurality of images focused on arbitrary subjects in an image from one captured image by changing the image processing method, and therefore, it is possible to reduce the number of times of image capturing.

In light field photography, the direction and intensity of a light beam that passes through each position (light field, hereinafter, referred to as "LF") in a plurality of positions in the space are calculated from multi-viewpoint image data. Then, by using the information of the obtained LF, an image on the assumption that light passes through a virtual optical system and forms the image on a virtual sensor is calculated. By appropriately setting such a virtual optical system and a virtual sensor, refocus described previously is enabled. As an image capturing device for obtaining LF, a Plenoptic camera in which a microlens array is placed behind a main lens and a camera array in which compact cameras are arranged side by side are known. It is possible for both to acquire a multi-viewpoint image in which the image of a subject is captured in different directions by one-time image capturing. It is also possible to represent light field photography as calculation of an image acquired by a virtual sensor under virtual optical conditions from multi-viewpoint image data. In the following, the processing to calculate an image acquired by a virtual sensor is referred to as "refocus processing". As refocus processing, there is known a method in which acquired multi-viewpoint image data is subjected to projective transformation onto a virtual sensor, and added and averaged (WO 2008/050904).

In such refocus processing, the value of a pixel on a virtual sensor is calculated using a pixel of a multi-viewpoint image corresponding to the position of the pixel. Normally, to one pixel of a virtual sensor, a plurality of pixels of a multi-viewpoint image corresponds.

In WO 2008/050904 described above, a method of refocus processing of a color image is not described, but, it is possible to easily infer that refocus processing of a color image can be performed by performing processing separately for each of RGB planes.

A case is considered, where a sensor that acquires multi-viewpoint image data is a sensor that acquires a color by a color filter array (CFA), such as a Bayer array. In this case, when refocus processing is performed for each color plane described above, processing to interpolate a color missing in a sensor output pixel is required before the refocus processing. However, if color interpolation processing is performed, each part of the multi-viewpoint image (hereinafter, referred to as "sub image") is blurred, and therefore, sharpness is reduced. Then, as a result of image composition using sub images the sharpness of which is reduced, blurring occurs also in a composite image, and therefore, the sharpness of the image acquired finally is also reduced.

SUMMARY OF THE INVENTION

An image processing device according to the present invention is an image processing device that generates a composite image using multi-viewpoint image data before color interpolation captured by a camera array image capturing device and is characterized by including a unit configured to acquire information of a pixel value and a pixel position in the multi-viewpoint image data, a pixel position determination unit configured to determine the pixel position in the composite image in the pixel position of each pixel of the multi-viewpoint image data in accordance with an arbitrary refocus position based on optical parameters at the time image capturing, a color derivation unit configured to derive the color of each pixel of the multi-viewpoint image data, and a pixel value calculation unit configured to calculate the pixel value of each pixel of the composite image using the calculated pixel position in the composite image and the pixel value of the multi-viewpoint image data corresponding to the derived pixel color.

According to the present invention, it is possible to acquire a sharp composite image using multi-viewpoint image data before color interpolation processing is performed.

Further features of the present invention will become apparent from the following description of exemplary embodiments (with reference to the attached drawings).

BRIEF DESCRIPTION OF THE DRAWINGS

FIG. 6 is a diagram showing a concept of a multi-viewpoint image acquired by a sensor;

FIG. 10 is a diagram showing a color filter of a Bayer array;

FIG. 11 is a diagram showing an example of intermediate data stored in a buffer;

FIG. 16 is a diagram showing an example of a fixed region determined in advance in a composite image according to a third embodiment;

FIG. 22 is a diagram showing an example of intermediate data to be updated.

DESCRIPTION OF THE EMBODIMENTS

First Embodiment

Figure 1:
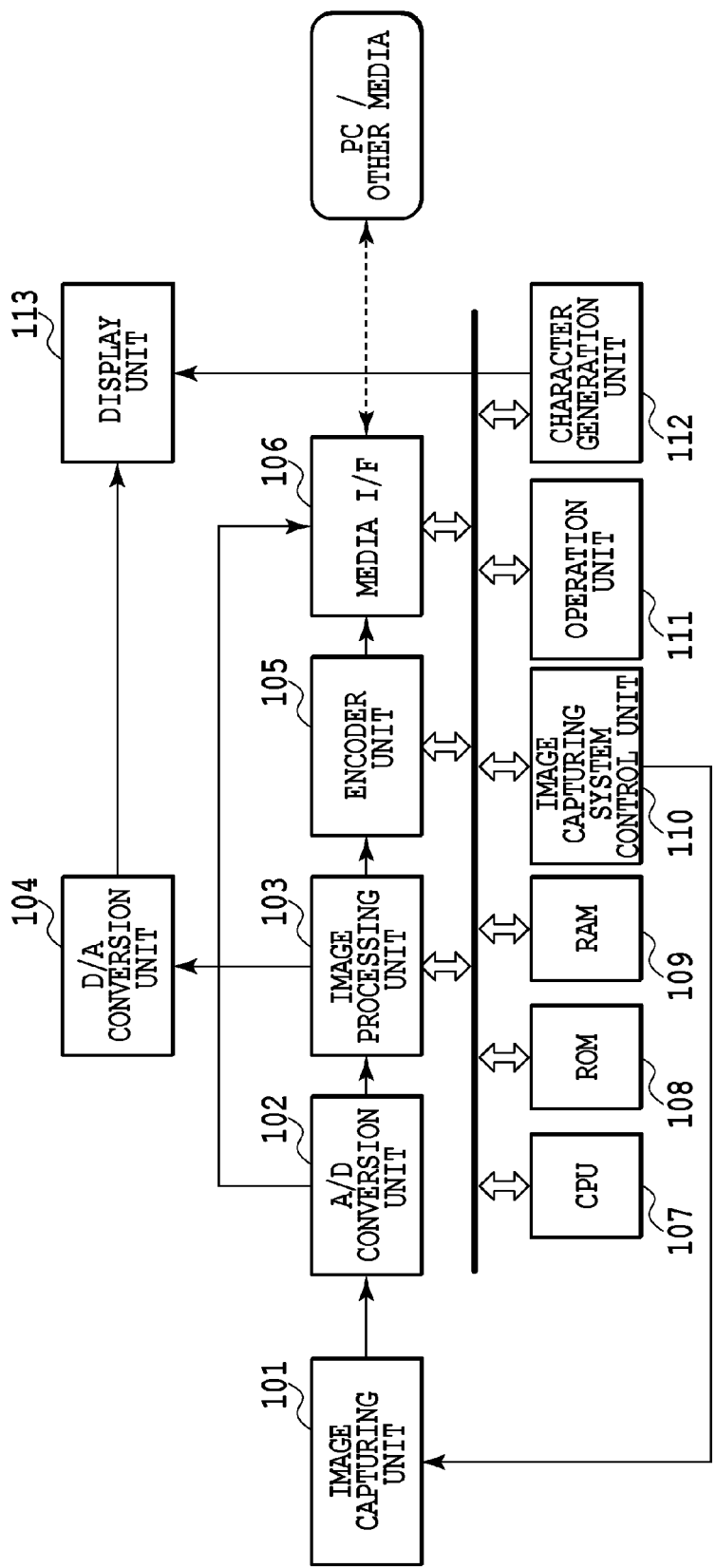
FIG. 1 is a diagram showing principal components of a camera array image capturing device according to an embodiment.

FIG. 1 is a diagram showing principal components of a camera array image capturing device (also referred to simply as a "camera array", as known as camera array system, multiple lens camera, and the like) according to a first embodiment.

An image capturing unit 101 includes a zoom lens, a focus lens, a camera shake correction lens, a diaphragm, a shutter, an optical low-pass filter, an iR cut filter, a color filter, and sensors, such as CMOS and CCD, and detects the quantity of light of a subject. It is possible for the image capturing unit 101 to obtain multi-viewpoint image data, but, details will be described later. The optical low-pass filter is installed in order to reduce a high-frequency pattern that causes a false color in an image capturing system adopting a color filter and reduces an amplitude of an input pattern in the vicinity of the frequency that causes a false color.

An A/D conversion unit 102 converts the detected quantity of light of a subject into a digital value.

An image processing unit 103 performs various image processing on the converted digital value to generate a digital image. Details of the image processing unit 103 are described later.

AD/A conversion unit 104 performs analog conversion on the generated digital image.

An encoder unit 105 performs processing to convert the generated digital image into a file format, such as Jpeg and Mpeg.

A media interface 106 is an interface to connect a PC to another medium (for example, hard disk, memory card, CF card, SD card, USB memory).

A CPU 107 is a processor that totally controls each unit.

A ROM 108 stores a control program etc. executed in the CPU 107.

A RAM 109 functions as a main memory, a work area, etc., of the CPU 107.

An image capturing system control unit 110 performs control of the image capturing system based on an instruction from the CPU 107, such as focusing, releasing of shutter, and adjustment of diaphragm.

An operation unit 111 includes a button, a mode dial, etc., and through which a user specification is input. The specification of an arbitrary focus position (refocus position) when a composite image is generated after images are captured is also input through the operation unit 111.

A character generation unit 112 generates characters, graphics, etc.

A display unit 113 displays a captured image and a character received from the character generation unit 112 and the D/A conversion unit 104. As the display unit 113, generally, a liquid crystal display is used widely. Further, it may also be possible for the display unit 113 to have a touch screen function and it is also possible to handle a user specification using the touch screen as an input of the operation unit 111.

Next, details of the image processing unit 103 are explained.

Figure 2:
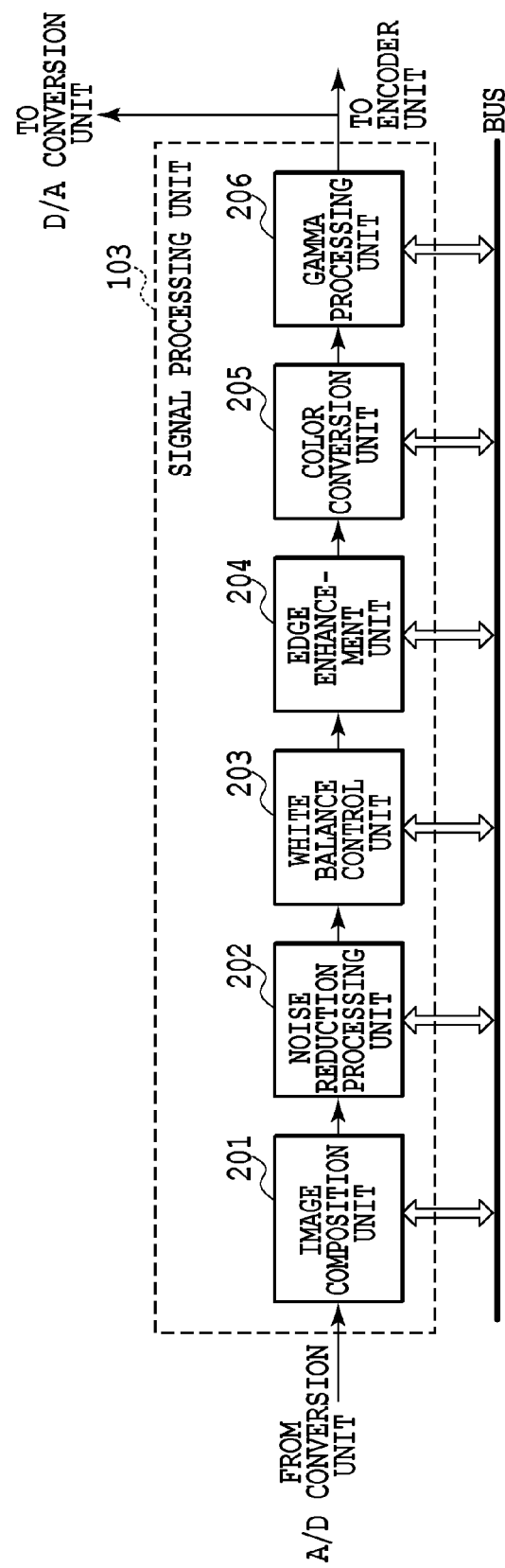
FIG. 2 is a diagram showing an example of an internal configuration of an image processing unit.

FIG. 2 is a diagram showing an example of an internal configuration of the image processing unit 103. The image processing unit 103 includes an image composition unit 201, a noise reduction processing unit 202, a white balance control unit 203, an edge enhancement unit 204, a color conversion unit 205, and a gamma processing unit 206. In the image processing unit 103, by each of these units, each image processing is performed on an input signal (digital image) from the A/D conversion unit 102 in order to improve image quality. The configuration shown in FIG. 2 is configured so that image composition processing is performed prior to other processing, but, the configuration is not limited to such a configuration. For example, it may also be possible to perform image composition processing after performing noise reduction processing. It is preferable for the image composition processing to be performed as one of various image processing in the image processing unit 103, but, the image composition processing needs not necessarily be limited thereto. Details of the image composition processing are described later.

In the present embodiment, the image processing unit 103 is explained as one component within the image capturing device, but, it may also be possible to implement the function of the image processing unit 103 by an external device, such as a PC. That is, the image processing unit 103 in the present embodiment can be implemented as one function of the image capturing device or as an independent image processing device.

<Principles of Refocus>

Figure 3:
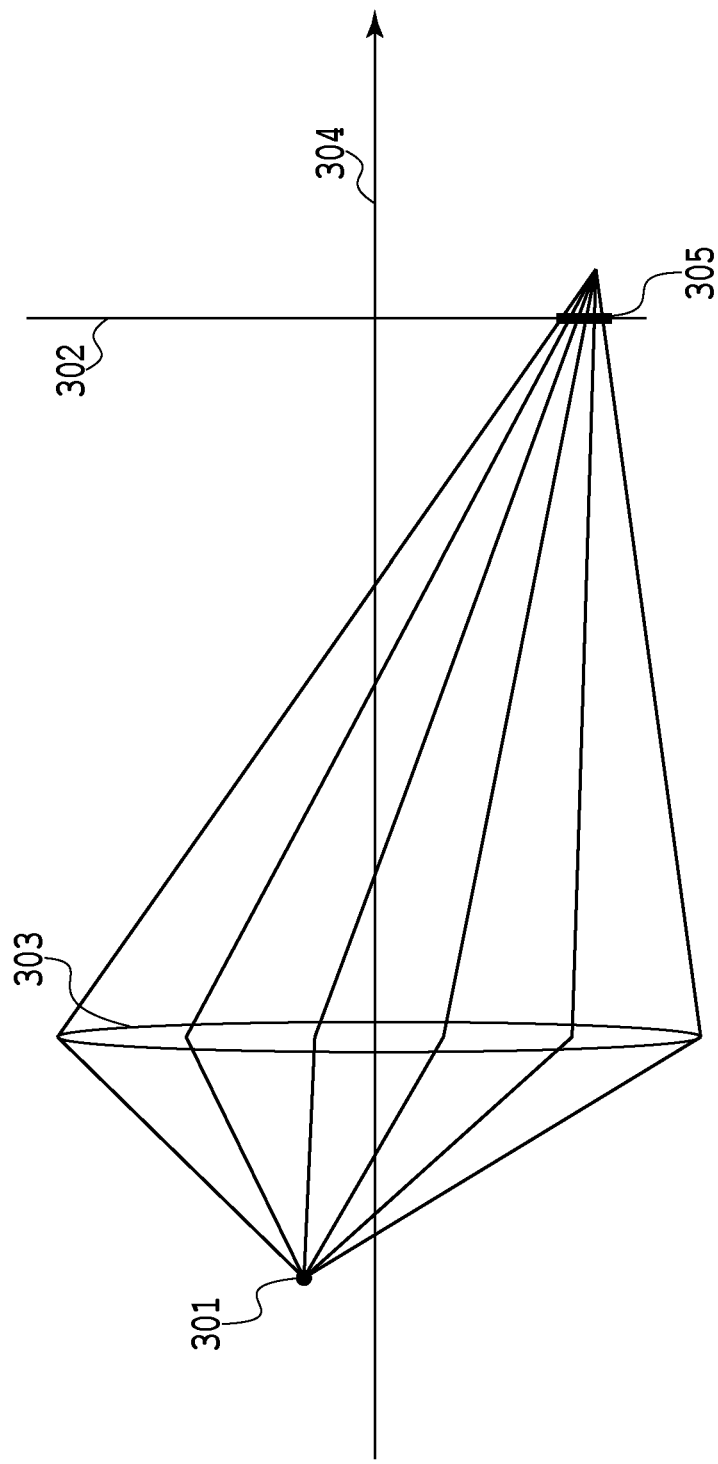
FIG. 3 is a diagram showing a configuration of a normal image capturing optical system.

FIG. 3 is a diagram showing a configuration of a normal image capturing optical system, representing an out-of-focus state. In FIG. 3, configurations of the IR cut filter, the zoom lens, the diaphragm, etc., are omitted. Further, the lens configuration is represented by a main lens 303 as a typical lens group.

Reference numeral 301 represents an object point and light from the object point 301 is collected by the main lens 303 and reaches a partial region 305 of a sensor 302. The light collected by the main lens 303 reaches the sensor 302 before forming an image at one point, and therefore, in the partial region 305 of the sensor 302, a spread image of the object point 301 is recorded, and therefore, the captured image becomes blurred. When it is desired to obtain a very sharp image, it is necessary to capture an image again after adjusting the focus position so that the image of the object point 301 is formed at one point on the sensor 302.

Figure 4:
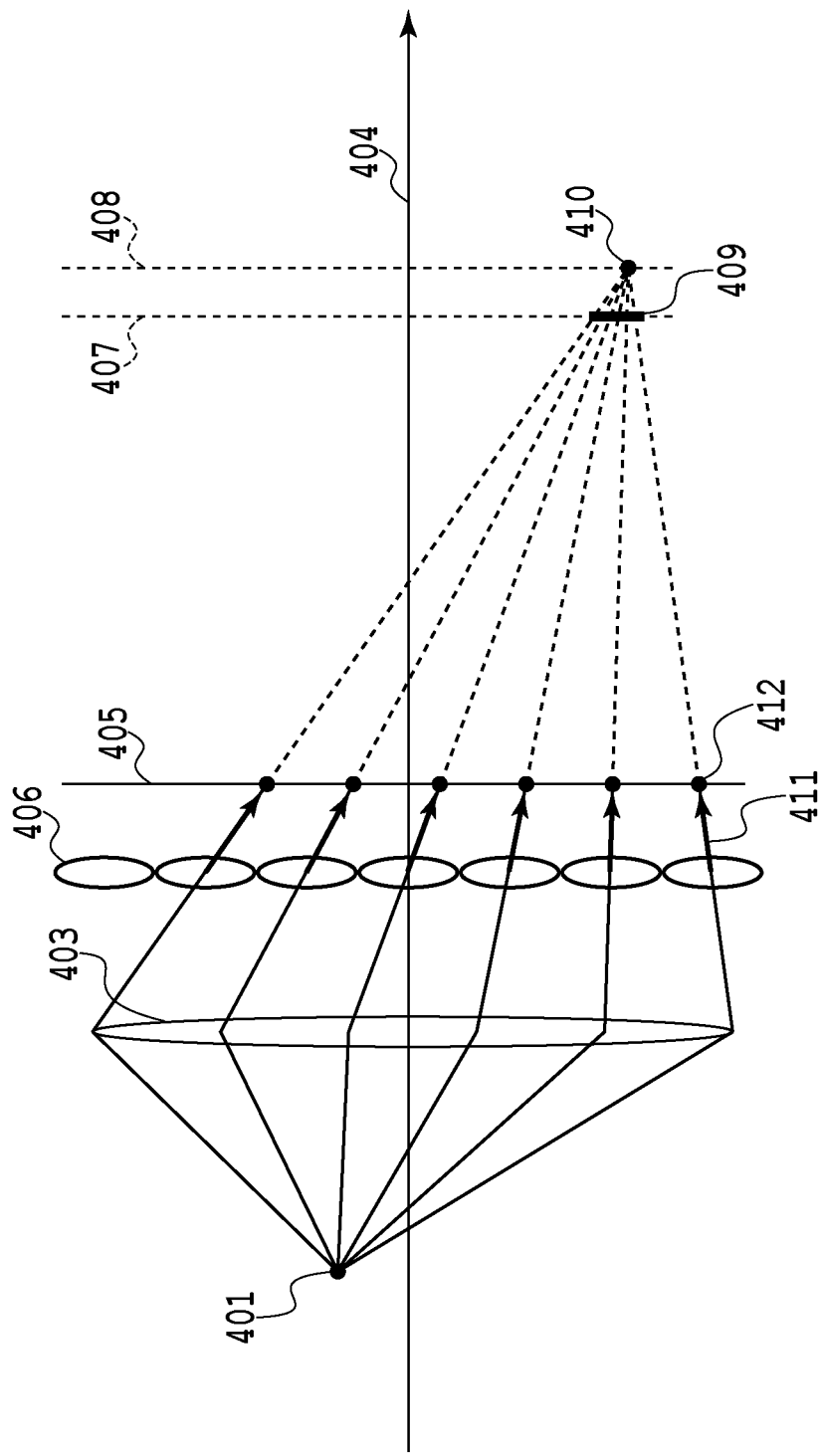
FIG. 4 is a diagram showing an example of a configuration of an image capturing unit.

FIG. 4 is a diagram showing an example of a configuration of the image capturing unit 101. In FIG. 4, light from an object point 401 is collected by a main lens 403 and recorded by a sensor 405 after passing through a microlens array 406 before forming an image. The optical image on the sensor generated by one microlens is an image of the object point 401 observed in a different direction, and therefore, in the sensor 405, images of multiple viewpoints are recorded as one piece of image data. FIG. 6 is diagram showing a concept of a multi-viewpoint image acquired by the sensor 405. As the pixel value of a pixel 412 on the sensor 405, a value in accordance with the intensity of a light beam 411 is recorded and for other pixels (positions) of the sensor 405, values in accordance with the intensities of light beams are recorded. By extending the group of light beams and averaging the light intensities at virtual sensors 407 and 408, it is possible to obtain images recorded in both the virtual sensors by calculation. When an image at the virtual sensor 407 is calculated, the light of the object point 401 spreads and such an image as that in the out-of-focus state shown in FIG. 3 is obtained. Similarly, when an image at the virtual sensor 408 is calculated, the light emitted from the object point 401 converges on one point and an image in the focused state is obtained.

A multi-viewpoint image including images of a subject captured in a plurality of different directions by the camera array image capturing device including the image capturing unit as described above is obtained and processing to calculate light received by a virtual sensor is performed based on the light beam information obtained from the multi-viewpoint image. Calculation by adjusting the position of the virtual sensor at that time corresponds to the adjustment of the focus position, that is, refocus.

Figure 5:
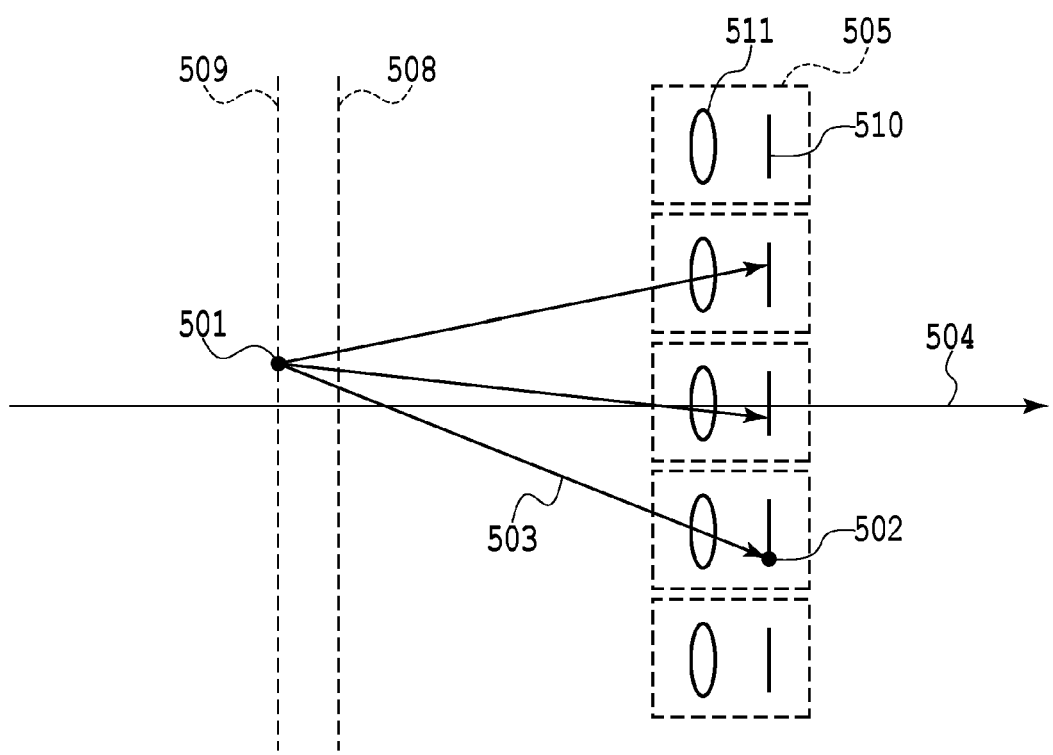
FIG. 5 is a diagram showing an example of a configuration of an image capturing unit.

FIG. 5 is a diagram showing another example of the configuration of the image capturing unit 101. In FIG. 5, the image capturing unit 101 includes a plurality of image capturing units 505. The image capturing unit 505 includes a sensor 510 and a lens 511. Reference numeral 504 represents an optical axis. Light from an object point 501 is recorded by the sensor 510 within the image capturing unit 505 and for example, a pixel 502 on the sensor 510 records the intensity of a light beam 503. It is assumed that a case where virtual sensors 508 and 509 are placed on the object side is considered, and the group of light beams is extended in the direction toward the virtual sensors 508 and 509, and the light beam intensities are averaged at the virtual sensors 508 and 509. Then, an image calculated at the virtual sensor 508 is a blurred image of the object point 501 in an out-of-focus state and an image calculated at the virtual sensor 509 is an image of the object point 501 in the focused state.

The above is the principles of refocus to acquire an image the focus position of which is adjusted after capturing the image by calculation.

<Image Composition Processing>

Next, details of the image composition unit 201 within the image processing unit 103 are explained.

Figure 7:
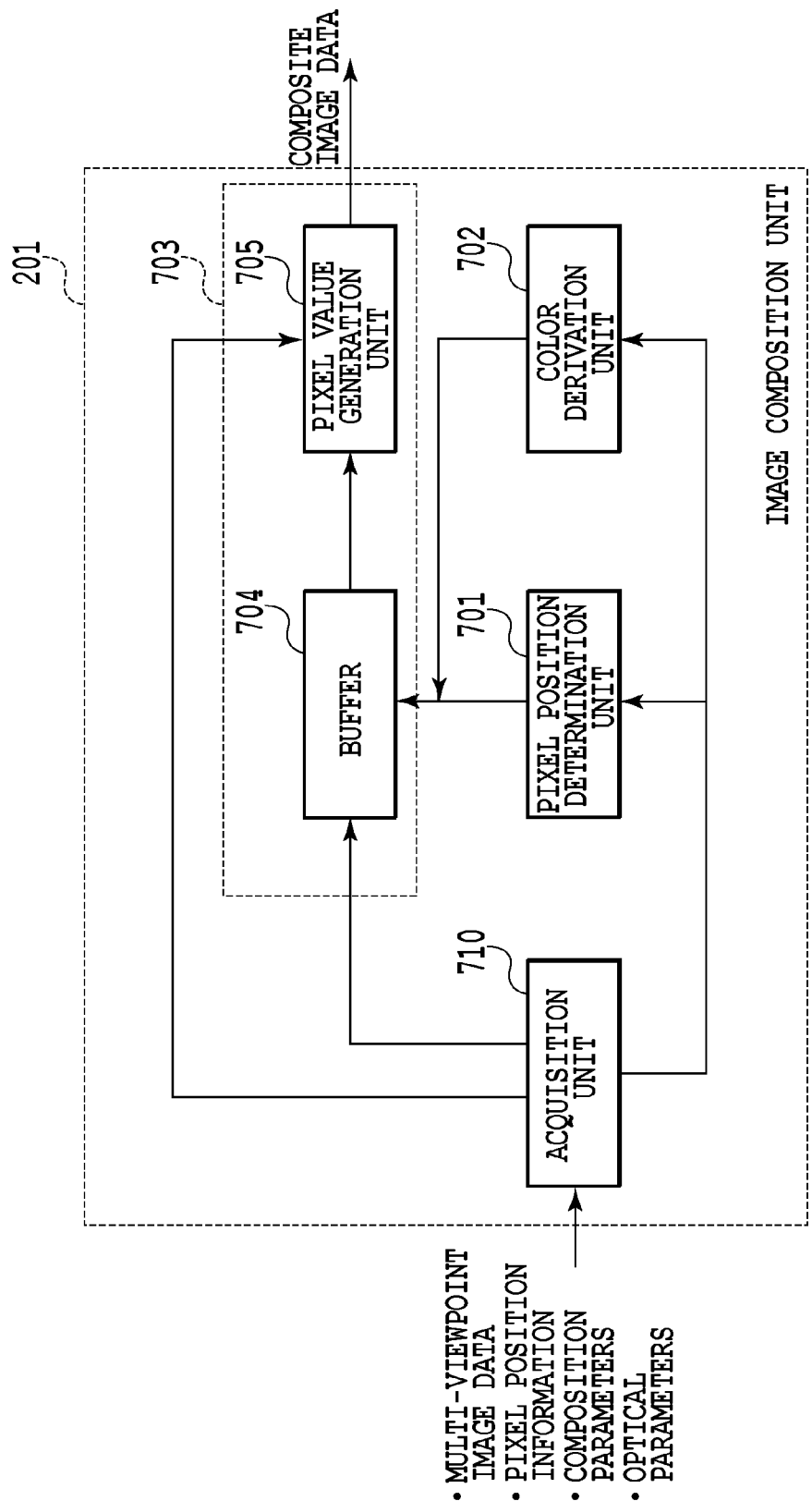
FIG. 7 is a diagram showing an internal configuration of an image composition unit.

FIG. 7 is a diagram showing an internal configuration of the image composition unit 201 according to the present embodiment. The image composition unit 201 includes a pixel position determination unit 701, a color derivation unit 702, a pixel value calculation unit 703, and an acquisition unit 710 and further, the pixel value calculation unit 703 includes a buffer 704 and a pixel value generation unit 705. In the image composition unit 201, each of these units performs processing to calculate pixel values of a composite image from the image data (digital value) of a multi-viewpoint image sequentially sent from the A/D conversion unit 102 and to output the pixel values in order of completion of calculation to the noise reduction processing unit 202. This is explained in detail below.

Figure 8:
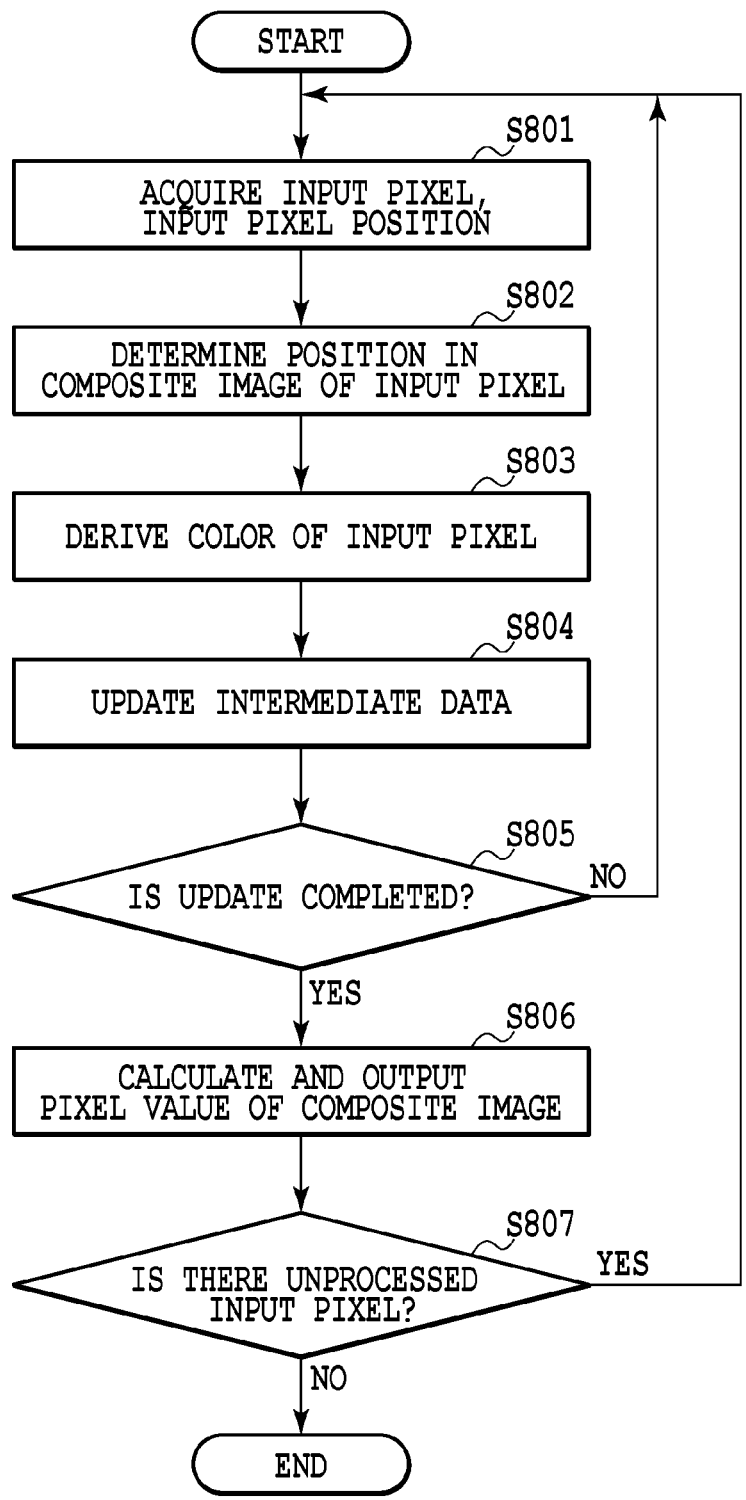
FIG. 8 is a flowchart showing a flow of image composition processing in an image composition unit.

FIG. 8 is a flowchart showing a flow of image composition processing in the image composition unit 201. In order to simplify explanation, the image data (input image data) of a digital value input from the A/D conversion unit 102 is assumed to be one-dimensional data.

In step 801, the acquisition unit 710 of the image composition unit 201 acquires the pixel value and the pixel position in the multi-viewpoint image data, and further, optical parameters and composition parameters via a bus (not shown schematically). Here, optical parameters are various parameters physically determined at the time of image capturing and include, for example, values of 1, x, σreal, etc., to be described later. Combination parameters are various parameters that relate to image processing and the setting of which can be appropriately changed and include, for example, the refocus distance, which is a distance to a target subject of focusing, values of weight coefficients (C1 to C9) in a second embodiment, etc.

Figure 9:
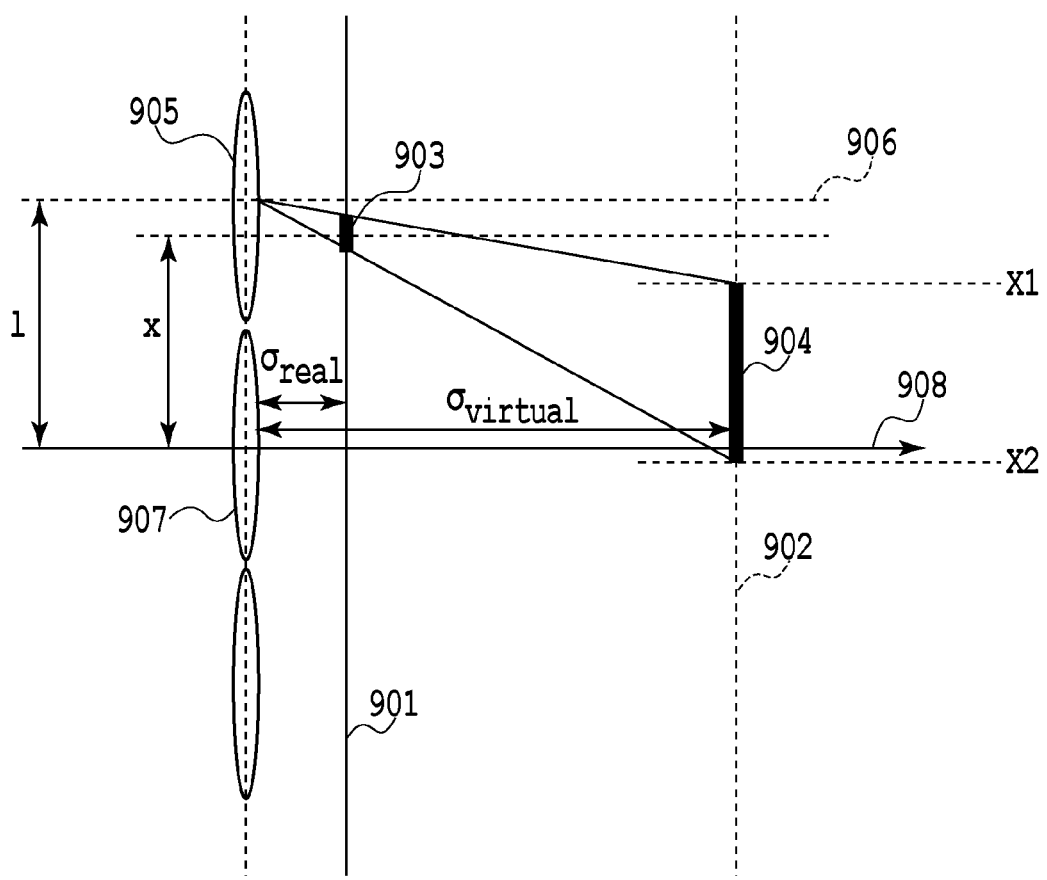
FIG. 9 is a diagram explaining a method for calculating a pixel position in a composite image of each pixel of multi-viewpoint image data.

In step 802, the pixel position determination unit 701 of the image composition unit 201 determines the pixel position in a composite image of each pixel of the acquired multi-viewpoint image data. FIG. 9 is a diagram explaining the determination method. Here, it is assumed that the pixel corresponding to a sensor pixel region 903 on a sensor 901 is input to the image composition unit 201. In this case, the pixel position determination unit 701 calculates and determines a projection region 904 on a virtual sensor 902, which corresponds to the sensor pixel region 903, as a result. In FIG. 9, symbol 1 represents a distance between the centers (optical centers) of neighboring microlenses (in FIGS. 9, 905 and 907). Symbol x represents the position of the input pixel (in FIG. 9, the distance between an optical axis 908 that passes through the optical center of the microlens 907 and the center of the sensor pixel region 903). Symbols X1 and X2 represent positions on the virtual sensor 902, which are found by calculation, and a region between the calculated X1 and X2 is the projection region 904. As shown in FIG. 9, the projection region 904, which is the sensor pixel region 903 projected onto the virtual sensor 902 with reference to the optical center of the microlens 905, is the position in the composite image of the pixel of the input multi-viewpoint image data. Reference numeral 906 represents an optical axis that passes through the optical center of the microlens 905. Then, symbol σreal represents a distance between the sensor 901 and each microlens and symbol σvirtual represents a distance between each microlens and the virtual sensor 902. As is obvious from FIG. 9, the projection region 904 is enlarged with respect to the sensor pixel region 903 and the enlargement ratio is σvirtual/σreal. Here, σvirtual is set in accordance with the distance (refocus distance) from the camera to a target subject of focusing specified by a user. In the case of the image capturing unit with the configuration shown in FIG. 4, in order to derive the virtual sensor position from a refocus distance σfocus, the focal length of the main lens 403 is taken to be $f_{main}$ and then σvirtual is found by a relationship expressed by Equation below.

$$(1/\sigma focus)+(1/\sigma virtual)=(1/f_{main}) \quad \text{Equation (1)}$$

Here, the refocus distance σfocus is the distance along the optical axis 404 from the center of the main lens 403 to the object point 401.

Further, in the case of the image capturing unit with the configuration shown in FIG. 5, $f_{main}$ is set to infinity and σvirtual=−σfocus is assumed in Equation (1) described above. Equation (1) described above is an equation expressing an actually complicated lens configuration in a simplified manner, and therefore, when higher precision is demanded, the setting is done in advance in accordance with the refocus position specified by a user. For example, a correspondence relationship between the refocus position and the position of the virtual sensor, at which an image of a subject at the refocus position is formed sharply, is found in advance by an optical simulation and stored in the ROM 108 etc. and the setting is done by the image composition unit 201 appropriately referring thereto. The pixel position determination unit 701 calculates the positions of X1 and X2 that define the projection region 904 according to Equation (2) and Equation (3) below.

$$X1=1+(\sigma virtual/\sigma real)*(x+s/2-1) \quad \text{Equation (2)}$$

$$X2=1+(\sigma virtual/\sigma real)*(x-s/2-1) \quad \text{Equation (3)}$$

In Equation (2) and Equation (3) described above, symbol s represents the size of the sensor pixel region 903. Information of the calculated X1 and X2 is output to the pixel value calculation unit 703.

In this manner, the pixel position of each pixel of multi-viewpoint image data, which is input image data, and the pixel position of the composite image in accordance with an arbitrary focus position are associated with each other. Explanation is returned to the flowchart in FIG. 8.

In step 803, the color derivation unit 702 derives the color of each pixel of the input multi-viewpoint image data. As a type of color, mention is made of RGB, infrared+RGB, CMY, etc., in accordance with the filter spectral sensitivity of the color filter array. Here, a case of three colors of RGB is considered. The color derivation unit 702 refers to a table indicating a correspondence between the input pixel position and the color and derives the color of the input pixel. For example, when the resolution is six million pixels, the table indicating the correspondence between the input pixel position and the color is a table with 2,000 pixels in the vertical direction and 3,000 pixels in the transverse direction and may be stored in the ROM 108 etc. Further, when the relationship between the input pixel position and the color is explicit by a mathematical equation, such as when the image capturing unit 101 includes a color filter array of the Bayer array, it may also be possible to find the color from the input pixel position by a predetermined calculation. FIG. 10 is a diagram showing a color filter of the Bayer array and it can be seen that the filters of G (Green) are used in the number twice that of filters of R (Red) and that of filters of B (Blue). Information of the derived color is output to the pixel value calculation unit 703.

In step 804, the pixel value calculation unit 703 updates the data (intermediate data) within the buffer 704. Specifically, the pixel value of the input multi-viewpoint image data corresponding to the determined pixel position in the composite image and the derived color is stored in the buffer 704. FIG. 11 shows an example of the intermediate data stored in the buffer 704. In FIG. 11, numerals 1101 to 1103 represent each index in the present embodiment and in each index, one or more pixel values are retained. In this step, the input pixel value is added/stored in accordance with the pixel position of the composite image received from the pixel position determination unit 701 and the information of the color received from the color derivation unit 702 and thus the intermediate data is updated. In the example in FIG. 11, the pixel position of the composite image is expressed by integers, but, X1 and X2 calculated by Equations (2) and (3) are not integers in general. Hence, it may also be possible to accept non-integral values as numerical values to identify the pixel position of the composite image and to use the fractional part as a weight in calculation of the pixel value of the composite image. For example, a case is considered where pixel value 20 is allocated to the coordinates (10, 10.4) indicating the pixel position of the composite image and similarly pixel value 10 is allocated to the coordinates (10, 10.1). In this case, for example, to the coordinates (10, 10) indicating the pixel position of the composite image, pixel value 12 is allocated by a weighted calculation, such as (0.1*20+0.4*10)/(0.1+0.4), and so on.

In step 805, the pixel value calculation unit 703 determines whether update of intermediate data is completed as to a predetermined index, that is, all the pixel values are stored in any of the indexes. For example, when two pixel values (24 and 26) are stored in the index 1101 (part in the pixel position of coordinates (10, 10) and the color of which is R), it is determined that the update of intermediate data is completed. It is possible to make this determination by calculating the number of pixel values that should be stored for each index in advance and by determining whether the number of stored pixel values has reached the number.

Here, the number of pixel values that should be stored in each index is found in advance as follows. First, a dummy captured image all the pixel values of which are 1 is provided and then the processing in step 802 to step 804 is performed using the dummy image as input image data. Then, after performing the processing on all the pixels, the number of stored pixel values is counted for each index.

When it is determined that all the pixel values that should be added are stored in any of the indexes by such determination processing, the process proceeds to step 806. On the other hand, when it is determined that all the pixel values are not stored in any of the indexes, the process returns to step 801 and the processing in step 801 to step 804 is repeated on the next pixel.

Figure 12:
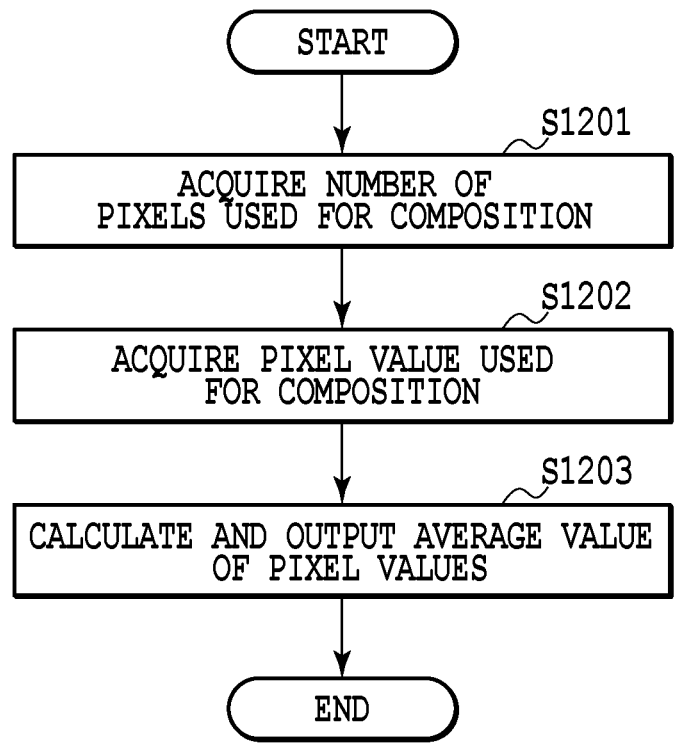
FIG. 12 is a flowchart showing details of processing to calculate a pixel value of a composite image according to a first embodiment.

In step 806, the pixel value generation unit 705 acquires intermediate data (pixel value of the multi-viewpoint image) of the index for which update has been completed and calculates an average value of the data and outputs it as the pixel value of the composite image. FIG. 12 is a flowchart showing details of the processing in this step. Here, a case is explained as an example, where the update of the index indicated by 1101 in FIG. 11 is completed.

In step 1201, the pixel value generation unit 705 acquires the number of pixel values used for composition from the bus. In the case of the index 1101, "2" is acquired as the number of pixel values used for composition.

In step 1202, the pixel value generation unit 705 acquires the pixel value of the multi-viewpoint image used for composition from the buffer 704. Here, "24" and "26" are acquired.

In step 1202, the pixel value generation unit 705 obtains an average value by dividing the sum of the pixel values of the multi-viewpoint image used for composition by the number of pixel values used for composition. Here, "25" is calculated by (24+26)/2. The calculated average value is output as the pixel value of the composite image corresponding to the index (here, pixel position: coordinates (10, 10), color: R).

In step 807, the image composition unit 201 determines whether the processing described above has been completed on all the pixels of the multi-viewpoint image data. When there is no unprocessed input pixel, the present processing is terminated. On the other hand, when there is an unprocessed input pixel, the process returns to step 801 and step 801 to step 806 are repeated.

By the above processing, the pixel value of the composite image in an arbitrary focus position is calculated sequentially and output to the noise reduction processing unit.

Figure 13:
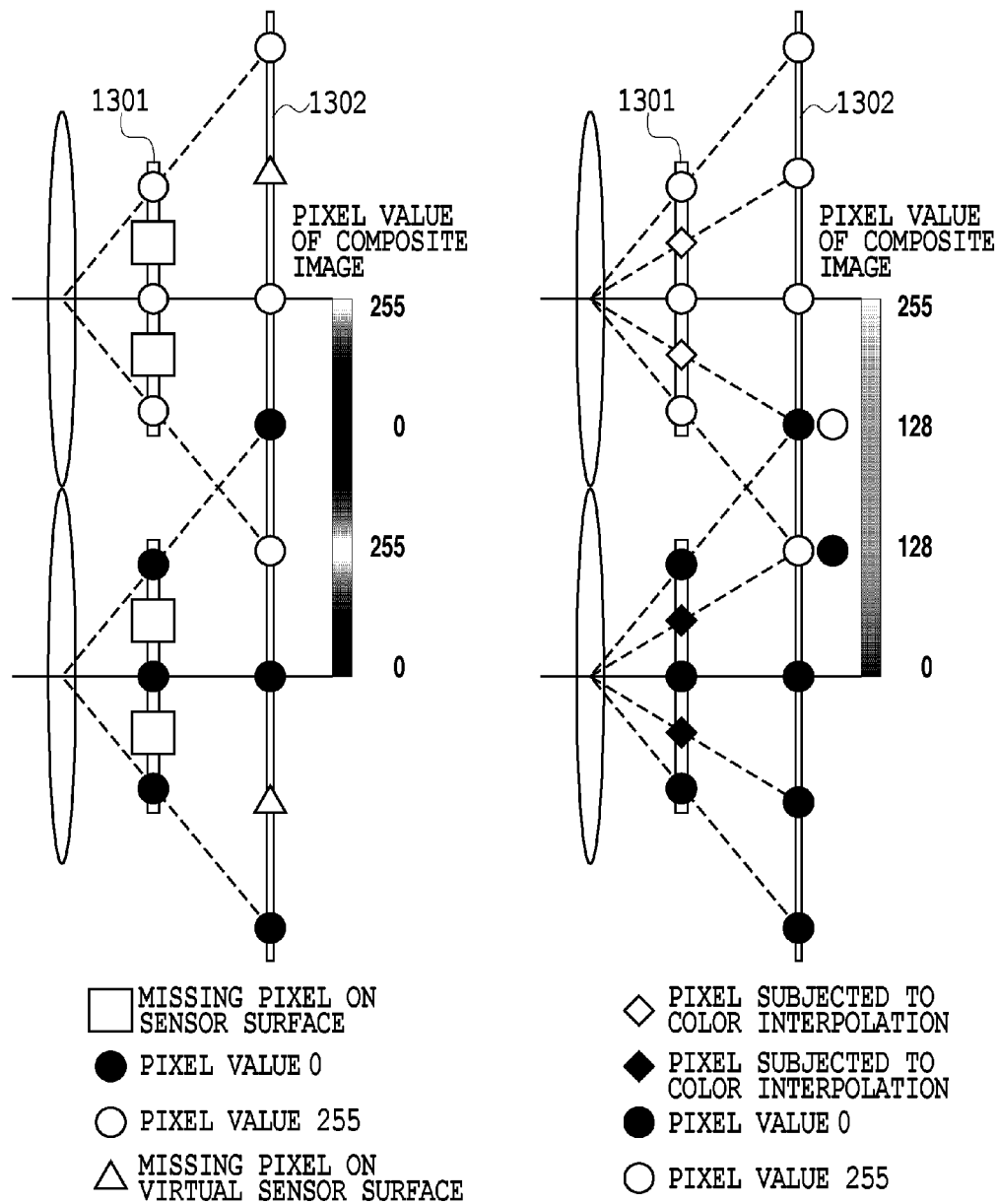
FIG. 13A is a diagram showing a composite image acquired when performing image composition without using a pixel subjected to color interpolation according to the first embodiment.
FIG. 13B is a diagram showing a composite image acquired using a pixel subjected to color interpolation in advance.

FIG. 13A shows a composite image obtained when image composition is performed without using the pixel subjected to color interpolation according to the present embodiment and FIG. 13B shows a composite image obtained using the pixel subjected to color interpolation in advance. In FIGS. 13A and 13B, reference numeral 1301 represents an actual sensor and 1302 represents a virtual sensor. Further, in the same figures, "○" and "•" represent a pixel (for example, G channel) and "○" means that the pixel value is 255 and "•" means that the pixel value is 0. Then, "□" on the sensor 1301 in FIG. 13A indicates that a pixel is missing. Then, "◇" and "◆" in FIG. 13B indicate that the pixel that is missing is subjected to color interpolation. In FIGS. 13A and 13B, if the composite images formed on the virtual sensor 1302 are compared, while the pixel values of the composite image in FIG. 13A are (255, 0, 255, 0), the pixel values are (255, 128, 128, 0) in FIG. 13B. This indicates that the composite image in FIG. 13A to which the present embodiment is applied is higher in frequency than the composite image in FIG. 13B (that is, sharper).

As above, according to the invention according to the present embodiment, it is possible to obtain a very sharp composite image because images are composed using the multi-viewpoint image data before color interpolation.

Second Embodiment

In the first embodiment, the pixel value of the composite image is calculated with the range in which the calculated pixel position of the composite image and the derived color are identical to each other as the unit of the index with respect to the input pixel sequentially acquired. Next, an aspect, in which the range in which the pixel position of the composite image is identical is used as the unit of the index, is explained as a second embodiment. The second embodiment differs from the first embodiment only in the range of one unit of the index, and therefore, explanation on the rest common to both the embodiments (steps 801 to 804, 807 of the flowchart in FIG. 8) is simplified or omitted and here, different points are explained mainly.

In the first embodiment, when the pixel values the pixel position and color of which are both in the same range are stored in step 805 of the flowchart in FIG. 8, the process proceeds to the next step 806 immediately and moves to the averaging processing in the pixel value generation unit 705. In the present embodiment, the process moves to the averaging processing in the pixel value generation unit 705 after the pixel values of all the colors as to the same pixel position (for example, all of RGB in the pixel position (10, 10)) are stored.

Specifically, the processing is performed as follows.

In step 805, the pixel value calculation unit 703 determines whether all the pixel values are stored in any of the indexes in the unit described above. In the case of the present embodiment, for example, when all the pixel values within the range of 1101 to 1103 (all of RGB in the position of the coordinates (10, 10)) in FIG. 11 are stored, it is determined that the update of intermediate data is completed. When it is determined that all the pixel values that should be added are stored in any of the indexes, the process proceeds to step 806. On the other hand, when it is determined that all the pixel values that should be added are not stored in any of the indexes, the process returns to step 801.

In step 806, the pixel value generation unit 705 first calculates the average value of the pixel values for each color as in the first embodiment. Then, weighted averaging is performed on the calculated average values (Rm, Gm, Bm), respectively, using Equation (4), Equation (5), and Equation (6) below, and thereby, pixel values (Rm', Gm', Bm') of the composite image are generated.

$$Rm' = C1*Rm + C2*Gm + C3*Bm \quad \text{Equation (4)}$$

$$Gm' = C4*Rm + C5*Gm + C6*Bm \quad \text{Equation (5)}$$

$$Bm' = C7*Rm + C8*Gm + C9*Bm \quad \text{Equation (6)}$$

C1 to C9 are weight coefficients and for example, C1, C5, and C9 are set to 0.8 and other weight coefficients are set to 0.1 etc. It is advisable to set C2, C3, C4, C6, C7, and C8 to a small value when it is not desired to change the color balance excessively. It may also be possible to set the weight coefficient of G, which is arranged larger in the number than that of other colors, relatively larger than other weight coefficients (in this case, C3), for example, in such a manner that C1=0.7, C2=0.2, and C3=0.1 in Rm'. Further, in the case of a monochrome image, it is advisable to set all the weight coefficients to the same value (C1 to C9 are all set to 0.33). The weight coefficients of C1 to C9 are retained in the ROM 108 as composition parameters and read appropriately at the time of calculation.

Figure 14:
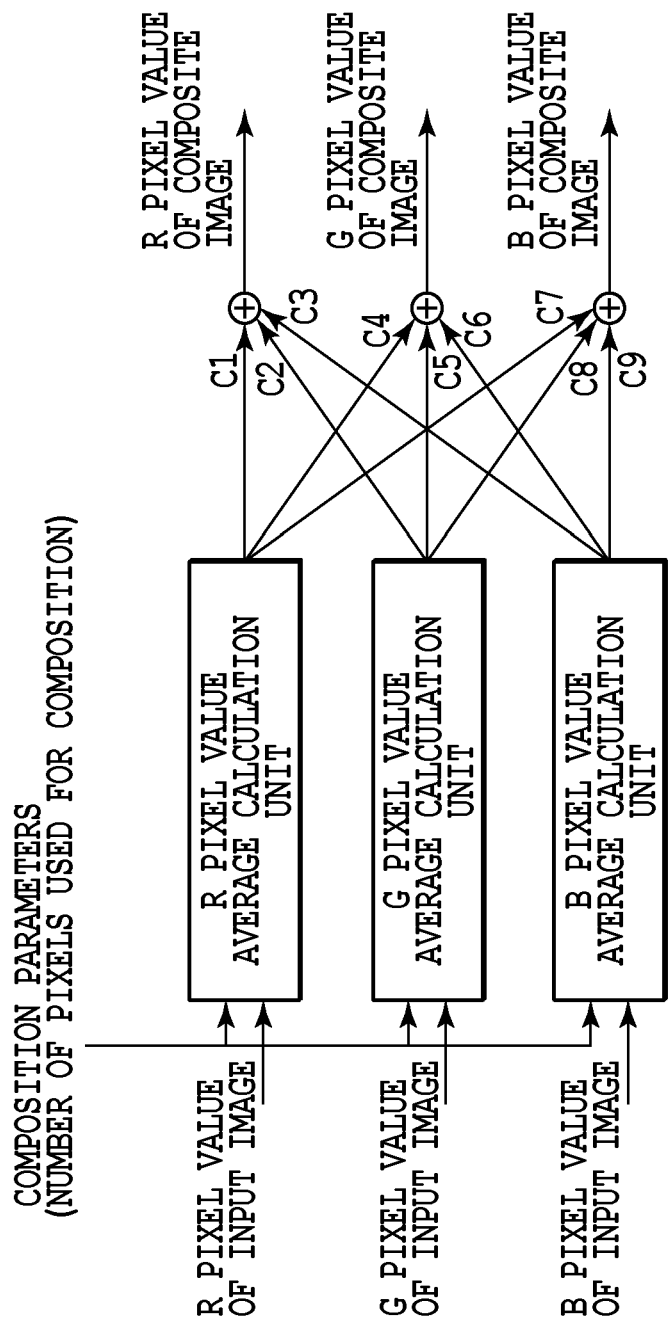
FIG. 14 is a diagram showing an internal configuration of a pixel value generation unit according to a second embodiment.

FIG. 14 is a diagram showing an internal configuration of the pixel value generation unit 705 according to the present embodiment. In the pixel value generation unit 705 of the present embodiment, the average of the pixel values is calculated individually for each of RGB and then each calculated average value is multiplied by each weight coefficient of C1 to C9 and the pixel values of RGB in the composite image are calculated.

Figure 15:
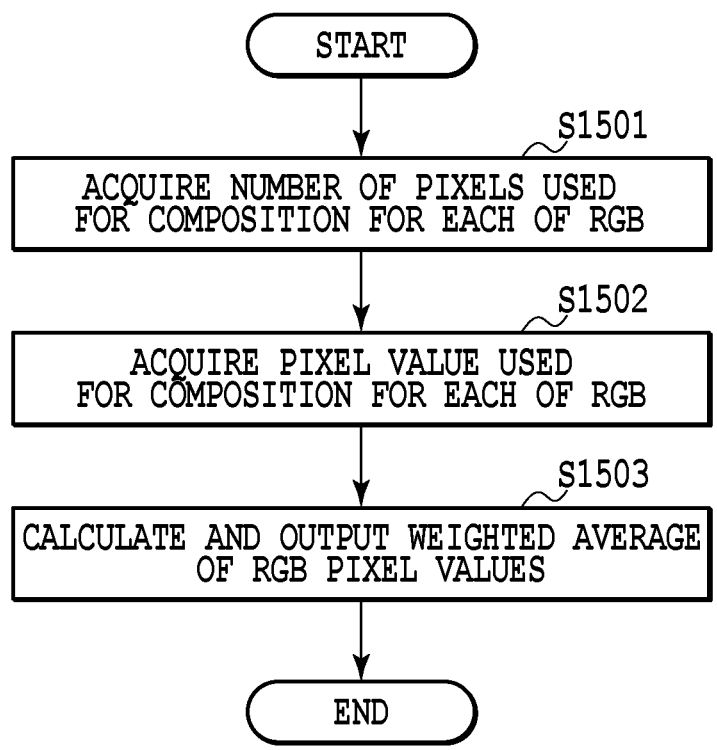
FIG. 15 is a flowchart showing details of processing to calculate a pixel value of a composite image according to the second embodiment.

FIG. 15 is a flowchart showing details of the processing in step 806 according to the present embodiment. Here, a case is explained as an example, where the update of the index indicated by 1104 in FIG. 11 is completed and as weight coefficients, C1, C5, and C9 are set to 0.8 and others are set to 0.1.

In step 1501, the pixel value generation unit 705 acquires the number of pixel values used for composition from the bus. Here, the number is the number of pixel values the pixel position of the composite image of which is the coordinates (10, 10), and therefore, "5" is acquired.

In step 1502, the pixel value generation unit 705 acquires the pixel values of the multi-viewpoint image used for composition from the buffer 704. Here, each pixel value, that is, "24" and "26" for R, "32" and "34" for G, and "22" for B are acquired.

In step 1502, the pixel value generation unit 705 calculates the average values (Rm, Gm, Bm) for each color and then performs weighted averaging in accordance with Equation (4) to Equation (6) described above and calculates Rm', Gm', and Bm'. In the case of the example described above, the following values are calculated and output as the pixel values of the composite image, respectively.

$$Rm' = (0.8 \times 25) + (0.1 \times 33) + (0.1 \times 22) = 25.5$$

$$Gm' = (0.1 \times 25) + (0.8 \times 33) + (0.1 \times 22) = 31.1$$

$$Rm' = (0.1 \times 25) + (0.1 \times 33) + (0.8 \times 22) = 23.4$$

As described above, according to the present embodiment, it is possible to further reduce noise of an image by using more pixel values of the multi-viewpoint image data when calculating one pixel value of a composite image.

Third Embodiment

In the region at the end of the composite image, a pixel may be generated, to which no pixel value of multi-viewpoint image is allocated. For example, in FIG. 13A, the pixel value is not allocated in the pixel position of Δ on the virtual sensor 1302. This means that none of the pixel values is allocated to the index specified by the pixel position and color of the composite image in the table in FIG. 11. Next, an aspect in which interpolation of the pixel value of the composite image is performed to prevent the occurrence of a missing pixel in the composite image is explained as a third embodiment. Explanation on parts common to those in the first embodiment (steps 801 to 804, 807 of the flowchart in FIG. 8) is simplified or omitted and here, different points are explained mainly.

In the first embodiment, when the pixel values in the range in which the pixel position and color are the same are stored in step 805 of the flowchart in FIG. 8, the process proceeds to the next step 806 immediately and moves to the averaging processing in the pixel value generation unit 705. In the present embodiment, the process proceeds to step 806 after the pixel values corresponding to a fixed region determined in advance in the composite image are stored for all the colors.

Specifically, the processing is performed as follows.

In step 805, the pixel value calculation unit 703 determines whether all the pixel values that should be stored and which correspond to a fixed region determined in advance in the composite image are stored. When it is determined that all the pixel values that should be stored are stored, the process proceeds to step 806. On the other hand, when it is determined that all the pixel values are not stored yet, the process returns to step 801.

In step 806, the pixel value generation unit 705 acquires all the stored pixel values corresponding to the fixed region of the composite image from the buffer 704, calculates an average value of the pixel values in all the pixel positions within the fixed region and outputs the average value. At this time, if there is a missing pixel having no pixel value, the pixel value is found by interpolation calculation and taken to be the pixel value of the missing pixel.

FIG. 16 is a diagram showing an example of a fixed region determined in advance in the composite image of a certain color. In FIG. 16, a blank portion 1601 in a fixed region 1600 determined in advance indicates a missing pixel with no pixel value. Other portions with some values are pixels with a pixel value and it is indicated that at least one pixel of the multi-viewpoint image is allocated. In this case, the pixel value of the missing pixel 1601 is found by the interpolation calculation using the pixel values therearound. As an interpolation calculation method, mentions is made of, for example, a method for obtaining an average value of pixel values in the 3×3 region around the missing pixel, a method for calculating a weighted average weighted in accordance with the distance from the missing pixel by further widening the region of pixels used for interpolation, etc. Further, it may also be possible to interpolate the pixel value by taking into consideration the pixel position identified by a non-integral number as explained in the first embodiment.

Figure 17:
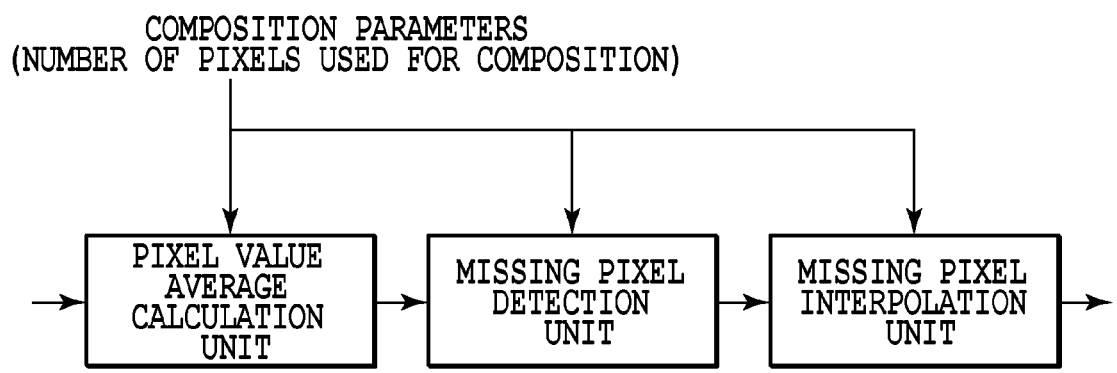
FIG. 17 is a diagram showing an internal configuration of a pixel value generation unit according to the third embodiment.
Figure 18:
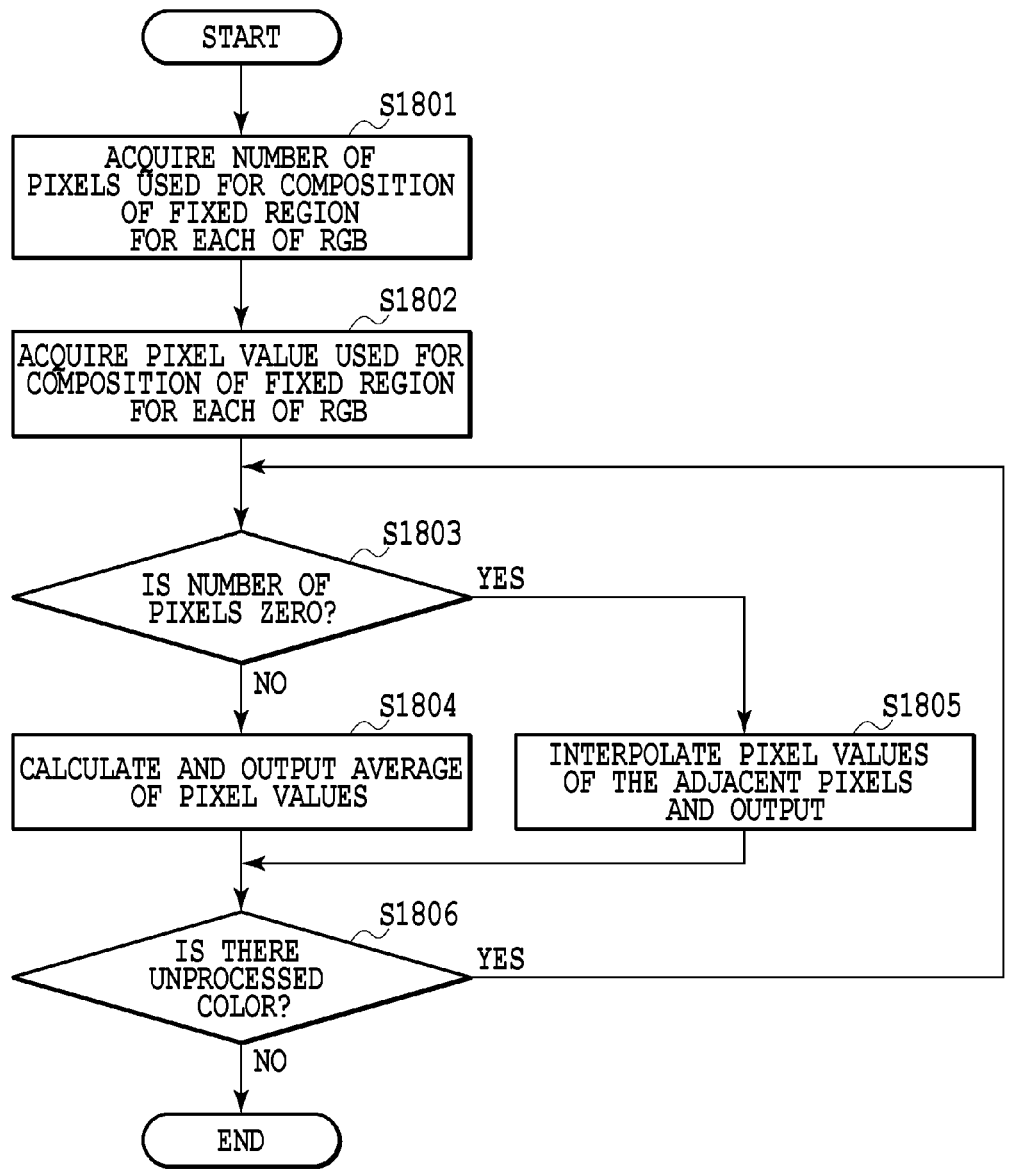
FIG. 18 is a flowchart showing details of processing to calculate a pixel value of a composite image according to the third embodiment.

FIG. 17 is a diagram showing an internal configuration of the pixel value generation unit 705 according to the present embodiment. The pixel value generation unit 705 of the present embodiment includes each processing unit shown in FIG. 17 and performs the processing described above. FIG. 18 is a flowchart showing details of the processing in step 806 according to the present embodiment.

In step 1801, the pixel value generation unit 705 acquires the number of pixels used for composition in a fixed region determined in advance of the composite image for each of RGB from the bus.

In step 1802, the pixel value generation unit 705 acquires the pixel values of the multi-viewpoint image in a fixed region determined in advance of the composite image for each of RGB from the buffer 704.

In step 1803, the pixel value generation unit 705 determines whether the number of pixels used for composition acquired in step 1801 is "0" for each color. When it is determined that the number is "0", the process proceeds to step 1805. On the other hand, when it is determined that the number is not "0", the process proceeds to step 1804.

In step 1804, the pixel value generation unit 705 calculates and outputs an average value of the target pixel values as in the first embodiment.

In step 1805, the pixel value generation unit 705 obtains and outputs a pixel value of the missing pixel in the composite image by performing the interpolation processing described above using the pixel values in the vicinity of the missing pixel.

In step 1806, the pixel value generation unit 705 determines whether there is an unprocessed color. When it is determined that there is an unprocessed color, the process returns to step 1803 and repeats the processing in step 1803 to step 1805 on the unprocessed color not subjected to the processing yet. On the other hand, when it is determined that the processing of all the colors has been completed, the processing is terminated.

As described above, according to the present embodiment, it is possible to prevent the occurrence of a missing pixel, which may occur in the region at the end of the composite image.

Fourth Embodiment

Next, an aspect in which a reduced image is generated is explained as a fourth embodiment. Explanation on parts common to the other embodiments is simplified or omitted and here, different points are explained mainly.

As shown in FIG. 6, a multi-viewpoint image captured by a camera array image capturing device includes small sub images. In the present embodiment, one sub image is utilized as a reduced image.

Here, a sub image to be utilized as a reduced image is in the state before color interpolation. Hence, it is necessary to appropriately perform color interpolation, but, on the other hand, there is such a problem that if color interpolation is performed using neighboring pixels, the image becomes blurred. Therefore, in the present embodiment, color interpolation of the value of a missing pixel in a sub image, which is utilized as a reduced image, is performed using the value of a corresponding pixel in another sub image.

Figure 19:
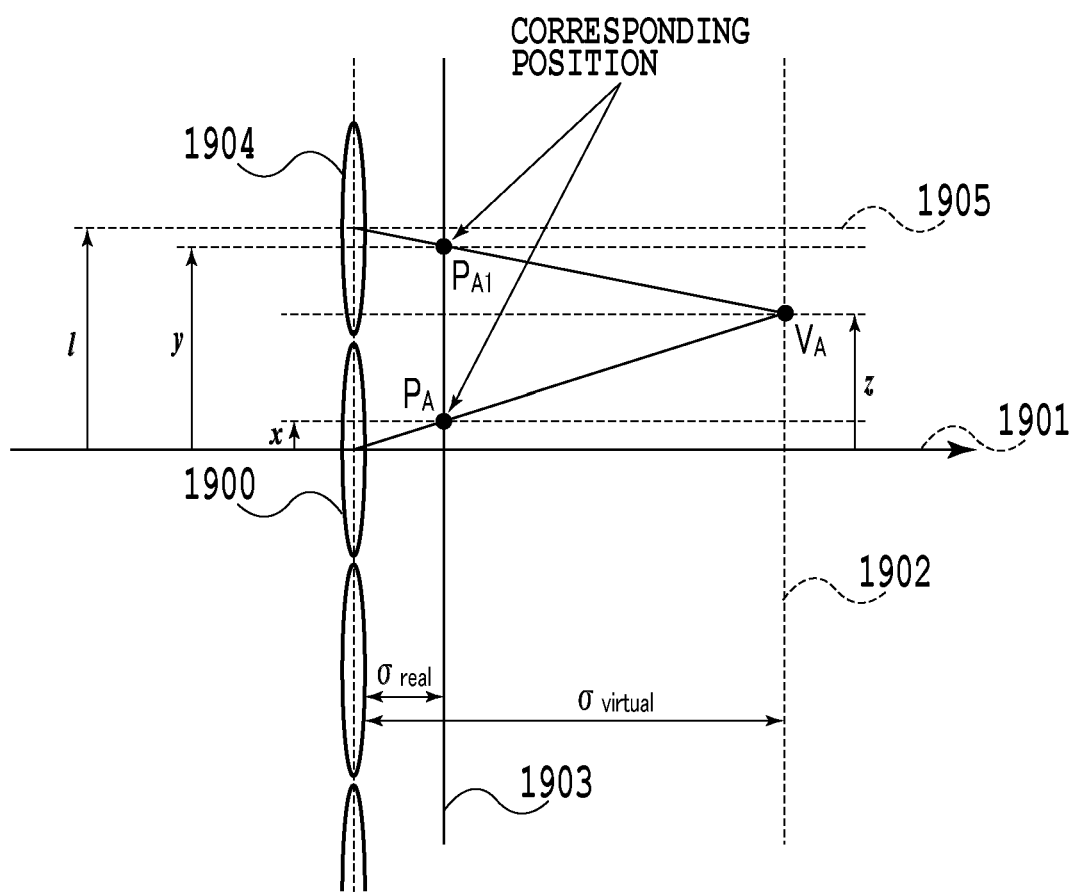
FIG. 19 is a diagram explaining a relationship between a missing pixel in a predetermined sub image and a corresponding pixel in another sub image according to a fourth embodiment.

FIG. 19 is a diagram explaining a relationship between a missing pixel in a predetermined sub image and a pixel corresponding to the missing pixel in another sub image. It is assumed here that RED is missing in a pixel in a position $P_A$ on a sensor 1903 (pixel in a sub image corresponding to a microlens 1900). Then, the position of the pixel in the position $P_A$ on a virtual sensor 1902 is taken to be $V_A$. In this case, a position $P_{A1}$ of a pixel corresponding to the position $V_A$ is obtained in the neighboring sub image (sub image corresponding to the microlens 1904).

That is, both the pixel in the position $P_A$ and the pixel in the position $P_{A1}$ correspond to the same position on a subject, and therefore, if the pixel in the position $P_A$ is RED, it is possible to perform color interpolation without blurring the image by replacing the pixel value of RED missing in the position $P_A$ with the pixel value in the position $P_{A1}$.

Further, in the present embodiment, there is a plurality of pixels corresponding to the position $P_A$ in other sub images, and therefore, the pixels corresponding to the position $P_A$ are listed and the missing color is derived appropriately from the listed corresponding pixels.

In the first embodiment, the size of the pixel is taken into consideration, but, the position $P_A$ in the present embodiment means the position in the center of the range occupied by one pixel and the size of the pixel is not taken into consideration in particular.

Further, it is preferable for reduced image generation processing, to be described below, to be performed as one of various image processing in the image processing unit 103, but, this is not limited.

Figure 20:
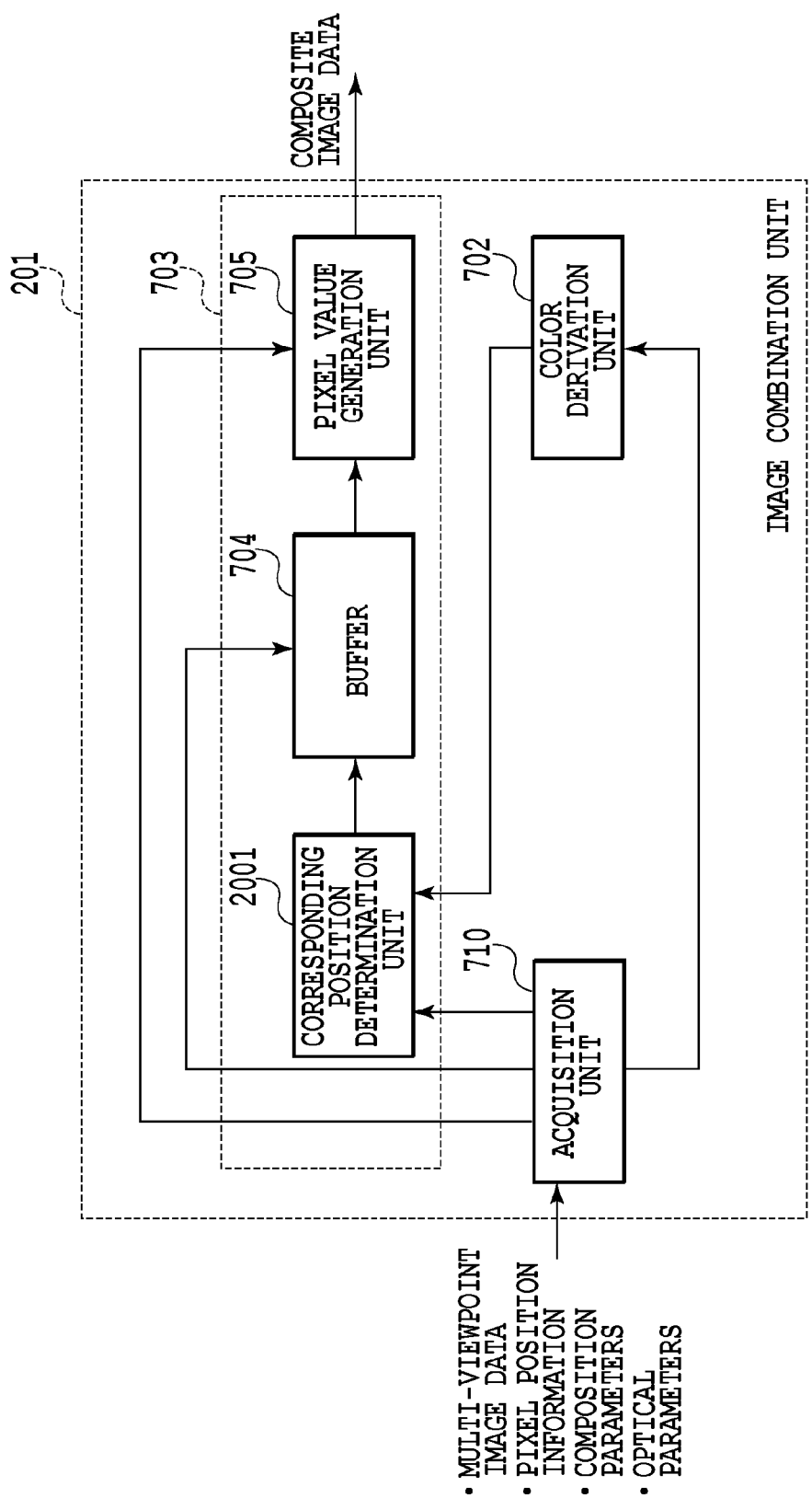
FIG. 20 is a diagram showing an internal configuration of an image composition unit according to the fourth embodiment.

FIG. 20 is a diagram showing the internal configuration of the image composition unit 201 according to the present embodiment. The image composition unit 201 includes the color derivation unit 702, the pixel value calculation unit 703, and the acquisition unit 710 and further, the pixel value calculation unit 703 according to the present embodiment includes a corresponding position determination unit 2001, the buffer 704, and the pixel value generation unit 705.

Figure 21:
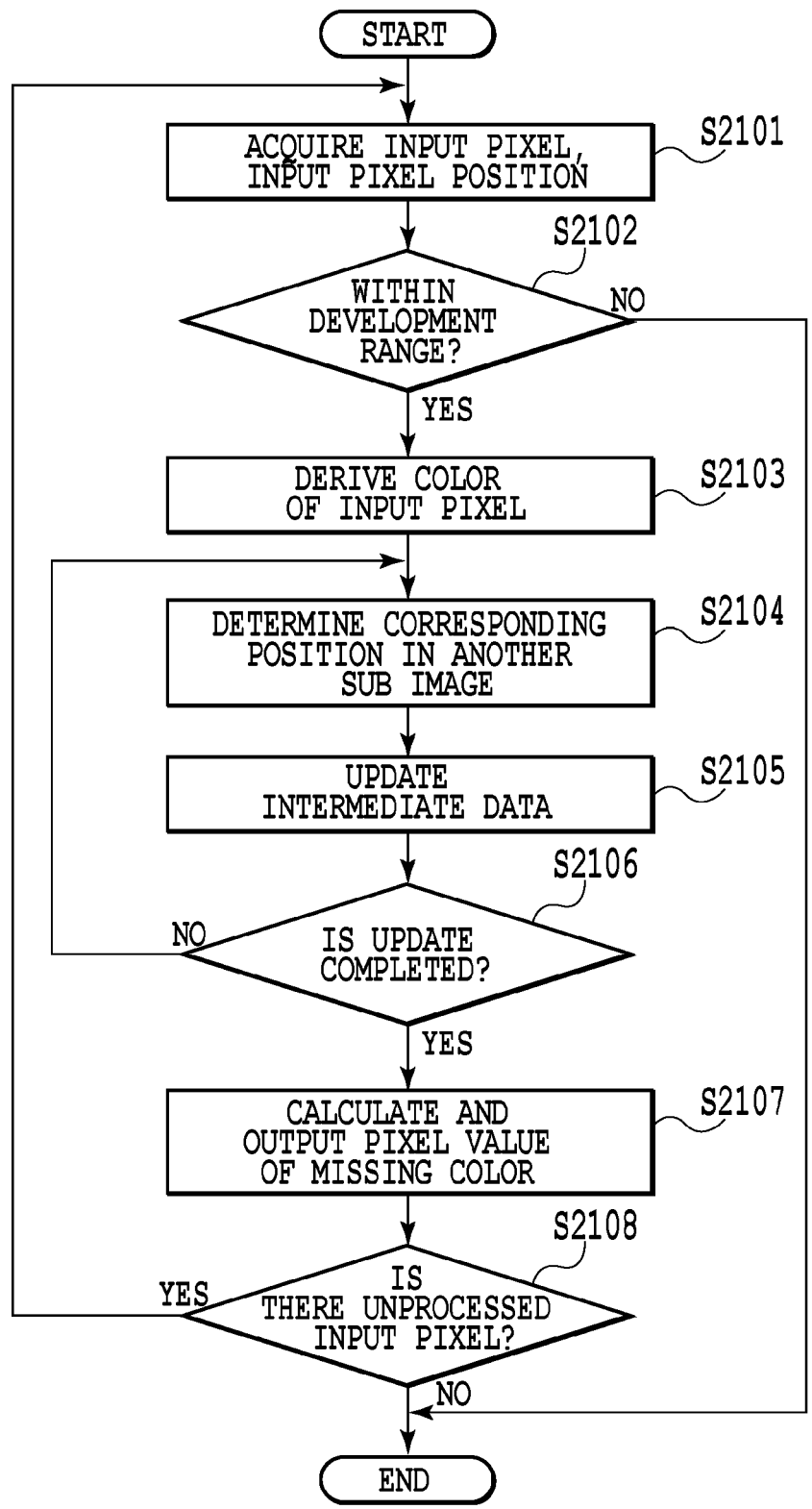
FIG. 21 is a flowchart showing a flow of reduced image generation processing according to the fourth embodiment.

FIG. 21 is a flowchart showing a flow of reduced image generation processing in the present embodiment. Explanation on parts common to those in the first embodiment is simplified or omitted.

In step 2101, the acquisition unit 710 of the image composition unit 201 acquires the pixel value and the pixel position in multi-viewpoint image data and further, optical parameters and composition parameters via a bus.

In step 2102, the image composition unit 201 determines whether the acquired pixel is within a development range. For example, when the sub image in the center in the multi-viewpoint image including the nine sub images shown in FIG. 6 is utilized as a reduced image, the development range is the range occupied by the sub image in the center. When it is determined that the acquired pixel belongs to the sub image in the center, the process proceeds to step 2103. On the other hand, when it is determined that the acquired pixel does not belong to the sub image in the center, the processing is terminated without performing color interpolation.

In step 2103, the color derivation unit 702 derives the color of each pixel of the input multi-viewpoint image data.

In step 2104, the corresponding position determination unit 2001 finds a position in another sub image corresponding to the acquired pixel. In FIG. 19 described previously, it is assumed that the position of the pixel belonging to the sub image in the center is $P_A$ and the position in the neighboring sub image corresponding to the position $P_A$ is $P_{A1}$. Then, the coordinate of the position $P_A$ is assumed to be x, the coordinate of the corresponding position $P_{A1}$ to be y, and the coordinate of the position $V_A$ on the virtual sensor 1902 of the position $P_A$ to be z. Reference numerals 1901 and 1905 represent an optical axis that passes through the optical center of the microlens 1900 and 1904 respectively. Then, there is a relationship expressed by Equation (7) below between z and x $z=(\sigma\text{virtual}/\sigma\text{real})*x$ \hfill Equation (7).

Further, there is a relationship expressed by Equation (8) between z and y $z=(\sigma\text{virtual}/\sigma\text{real})*(y-l)+l$ \hfill Equation (8).

Here, l represents the distance between the respective centers (optical centers) of the neighboring microlenses (1900 and 1904 in FIG. 19). Then, if z is eliminated from Equation (7) and Equation (8), Equation (9) is obtained as follows $y=l+x-(\sigma\text{real}/\sigma\text{virtual})*l$ \hfill Equation (9).

In this manner, an equation of relationship between x and y is obtained.

If Equation (9) is generalized, a coordinate yn of a corresponding point in an n-th sub image from the sub image in the center is expressed by Equation (10) as follows $yn=n*l+x-(\sigma\text{real}/\sigma\text{virtual})*n*l$ \hfill Equation (10).

The corresponding position determination unit 2001 calculates a corresponding position in another sub image of the acquired pixel position $P_A$ using Equation (10) described above. The calculated corresponding position is sent to the buffer 704 and at the same time, the type of color of the corresponding position and the pixel value are also sent together.

In step 2105, the pixel value calculation unit 703 updates the data (intermediate data) within the buffer 704. FIG. 22 is a diagram showing an example of the intermediate data updated in this step. The intermediate data here includes the pixel position, the type of color, and the pixel value corresponding to the pixel being processed currently. The buffer 704 retains such intermediate data, receives data in a new corresponding position from the corresponding position determination unit 2001, and updates data sequentially.

In step 2106, the image composition unit 201 determines whether the positions in all the other sub images, which correspond to the pixel acquired in step 2101, have been calculated. When the corresponding positions in all the other sub images have been calculated, the process proceeds to step 2107. On the other hand, when the corresponding positions in all the other sub images have not been calculated yet, the process returns to step 2104 and the corresponding position is found.

In step 2107, the pixel value generation unit 705 generates the pixel value of the missing color. For example, if it is assumed that the type of color of the pixel being processed currently is BLUE, then, missing colors are RED and GREEN. Here, it is assumed that the state when the update of the intermediate data is completed is the state in FIG. 22 described previously. In this case, the pixel value generation unit 705 calculates the average of the pixel values of RED and the average of the pixel values of GREEN in FIG. 22, respectively, and determines the pixel value of the missing color. That is, the pixel value calculated in the case of FIG. 22 for RED is (24+26+25)/3=25 and that for GREEN is (32+34)/2=33. The calculated pixel values of RED and GREEN are output as the pixel values of reduced images together with the pixel value of BLUE that is not missing.

In step 2108, the image composition unit 201 determines whether the processing described above has been completed on all the pixels of the multi-viewpoint image data. When there is no unprocessed input pixel, the present processing is terminated. On the other hand, when there is an unprocessed input pixel, the process returns to step 2101 and step 2101 to step 2107 are repeated.

By the above processing, the pixel of a missing color is determined in the reduced image by referring to other sub images and image data of a sharp reduced image is generated.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-140741, filed Jun. 24, 2011, and 2012-107581, filed May 9, 2012, which are hereby incorporated by reference herein in their entirety.

What is claimed is:

1. An image processing device comprising:
an obtaining unit configured to obtain a plurality of color images each of which is captured, from a viewpoint different from each other, through a color filter array comprising a plurality of color filters corresponding to a plurality of colors, wherein each pixel of the plurality of color images misses information of at least one of the plurality of colors; and
a generating unit configured to generate, by combining the plurality of color images before performing an interpolation for the missing color information, and by performing an interpolation for color information on a combined image which is a result of the combination of the plurality of color images, a composite image which corresponds to an arbitrary focus position and comprises at least one pixel having information of all of the plurality of colors,
wherein the combined image includes at least one missing pixel having information of at least one of the plurality of colors and missing color information of at least one of the plurality of colors, and the generating unit performs interpolation for the missing color information on the missing pixel.

2. The image processing device according to claim 1, further comprising:
a derivation unit configured to derive, based on an optical parameter used in capturing the plurality of color images and the arbitrary focus position, a correspondence between pixel positions in the plurality of color images and a pixel position in the composite image,
wherein the generating unit determines a pixel value of the pixel having information of all of the plurality of colors by using pixel values of a plurality of pixels in the plurality of color images each of which corresponds to a different color in the plurality of colors and a same pixel position in the composite image.

3. The image processing device according to claim 1, wherein the generating unit performs the interpolation on the missing pixel by using a pixel value of a neighboring pixel in the combined image.

4. A method comprising the steps of:
obtaining a plurality of color images each of which is captured, from a viewpoint different from each other, through a color filter array comprising a plurality of color filters corresponding to a plurality of colors, wherein each pixel of the plurality of color images misses information of at least one of the plurality of colors; and
generating, by combining the plurality of color images before performing an interpolation for the missing color information, and by performing an interpolation for color information on a combined image which is a result of the combination of the plurality of color images, a composite image which corresponds to an arbitrary focus position and comprises at least one pixel having information of all of the plurality of colors,
wherein the combined image includes at least one missing pixel having information of at least one of the plurality of colors and missing color information of at least one of the plurality of colors, and the interpolation for the missing color information on the missing pixel is performed in the generating step.

5. A non-transitory computer readable storage medium storing a program for causing a computer to perform the method according to claim 4.

6. A camera array image capturing device including the image processing device according to claim 1.

7. The image processing device according to claim 1, wherein the generating unit determines, for each pixel in the combined image and each color in the plurality of colors, whether each pixel has the information of each color, and performs the interpolation for the missing color information on a pixel that is determined to have information of not all of the plurality of colors.

* * * * *